(12) United States Patent
Lindblad

(10) Patent No.: US 7,010,233 B2
(45) Date of Patent: Mar. 7, 2006

(54) INTERFACE DEVICE FOR A FIBEROPTIC COMMUNICATION NETWORK AND METHODS OF USING SUCH A DEVICE

(75) Inventor: Tommy Lindblad, Norsborg (SE)

(73) Assignee: Transmode Systems AB, Hägersten (SE)

( * ) Notice: Subject to any disclaimer, the term of this patent is extended or adjusted under 35 U.S.C. 154(b) by 673 days.

(21) Appl. No.: 10/005,177

(22) Filed: Dec. 7, 2001

(65) Prior Publication Data

US 2003/0108281 A1    Jun. 12, 2003

(51) Int. Cl.
*H04B 10/00* (2006.01)
*H04B 10/08* (2006.01)
*H04B 17/00* (2006.01)

(52) U.S. Cl. .................. 398/164; 398/151; 398/165; 398/12; 398/17

(58) Field of Classification Search ............... 398/135, 398/4, 7, 9, 2, 3, 19, 164, 151, 165, 12, 17; 257/79–82, 84
See application file for complete search history.

(56) References Cited

U.S. PATENT DOCUMENTS

| 4,842,801 A * | 6/1989 | Kamiguchi et al. ........ 264/40.1 |
| 5,757,998 A | 5/1998 | Thatcher et al. |
| 5,923,451 A * | 7/1999 | Karstensen et al. ......... 398/164 |
| 6,222,653 B1 * | 4/2001 | Asahi ............................ 398/4 |
| RE37,401 E * | 10/2001 | Yamashita et al. .......... 714/717 |
| 6,307,652 B1 * | 10/2001 | Fassih-Nia et al. ............. 398/4 |
| 6,310,992 B1 * | 10/2001 | Gehrke et al. ................. 385/24 |
| 6,359,713 B1 * | 3/2002 | DeCusatis et al. .......... 398/178 |
| 2003/0169470 A1 * | 9/2003 | Alagar et al. ............... 359/110 |

FOREIGN PATENT DOCUMENTS

| EP | 0437161 | 7/1991 |
| EP | 0720322 | 7/1996 |
| EP | 1043868 | 10/2000 |

* cited by examiner

*Primary Examiner*—M. R. Sedighian
*Assistant Examiner*—Quan-Zhen Wang
(74) *Attorney, Agent, or Firm*—Swidler Berlin LLP

(57) ABSTRACT

The invention concerns an interface device for a fiberoptic communication network. The interface device comprises an electric circuit arrangement 32, a first receiving section 34 for receiving a first transceiver module 24 and a second receiving section 36 for receiving a second transceiver module 26. The interface device also comprises a switching unit 54 for switching said electric circuit arrangement between at least a first and a second state. Furthermore, the interface device includes a controller 56 arranged to automatically control the switching unit 54 in response to at least one control signal such that said first or second states are selected depending on whether at least one control signal is received indicating either that no transceiver module 26 is attached to said second receiving section 36 or that no optical signal above a certain signal level is received by a transceiver module 26 attached to said second receiving section 36. The invention also concerns methods of using such an interface device.

15 Claims, 3 Drawing Sheets

INTERFACE DEVICE FOR A FIBEROPTIC COMMUNICATION NETWORK AND METHODS OF USING SUCH A DEVICE

BACKGROUND OF THE INVENTION

1. Field of the Invention

The invention relates in general to interfaces for fiberoptic communication networks, in particular, the invention relates to interfaces able to adapt, adjust or convert optical signals transmitted between different network units. The invention also relates to methods of using devices in such interfaces

2. Technical Background

FIG. 1 shows an example of a part of a fiberoptic communication network according to the prior art. The figure shows a subscriber or client unit 12 connected to a larger fiberoptic network 14 via an interface 10 and a multiplexer/demultiplexer 11. In a typical case the client may be a company which may also have its own fiberoptic network. The client may, for example, obtain access to the larger fiberoptic network 14 by an agreement with another company, which may here be called the provider. The provider may have several clients which all are connected to the larger fiberoptic network 14. The connection between the client unit 12 and the interface 10 is normally bi-directional, which in this document means that signals can be sent in two opposite directions, indicated by arrows in FIG. 1. The communication is in this case implemented via two optical fibers 16, 18. According to the shown example, also the communication between the interface 10 and the multiplexer/demultiplexer 11 takes place over two optical fibers 20, 22. The interface 10 is used to adapt the signals from the client unit 12 to the multiplexer/demultiplexer 11 and vice versa. The interface 10 may, for example, carry out wavelength conversion, amplification, noise reduction etc. The interface 10 normally includes means for converting optical signals from the client unit 12 to electrical signals and means for converting electrical signals to optical signals before they are transmitted to the multiplexer/demultiplexer 11. The interface 10 also normally includes means for converting optical signals from the multiplexer/demultiplexer 11 to electrical signals and means for converting electrical signals to optical signals before they are transmitted to the client unit 12. The conversion in the different directions may be carried out via transceivers 24, 26 which form part of the interface 10. The transceivers 24, 26 can be formed as pluggable modules which can be plugged into a circuit board.

The client unit 12 may be located at a shorter or longer distance from the interface 10.

It should also be mentioned that an interface 10 may not only be positioned between a client unit 12 and a multiplexer/demultiplexer 11. An interface 10 can also be used as a so-called repeater node in a fiberoptic communication path. An example of an interface 10 used as a repeater node is shown in FIG. 2. This figure shows that there may be several interfaces 9, 10, 13 connected after each the along a fiberoptic communication path.

An interface as described above can be quite expensive. In particular the transceivers that form part of the interface are often expensive.

SUMMARY OF THE INVENTION

A purpose of the present invention is to find a simplified manner of connecting different network units in a fiberoptic communication network by means of an interface. Another purpose is to allow for a flexible connection of different network units via an interface, such that the manner in which the network units are connected via the interface may depend on which network units are connected and on other factors, such that, for example, the distance between the network units. A further purpose is to provide an interface device which is automatically configured depending on how different network units are connected to each other via the interface. Still another purpose is to provide for automatic configuration in an interface device for a fiberoptic communication network, which interface device is of the kind that has an electric circuit arrangement, a first receiving section for receiving a first transceiver module and a second receiving section for receiving a second transceiver module, wherein the transceiver modules are of the kind that have, respectively, a receiver unit for receiving optical signals from an optical conduction path, the receiver unit comprising an opto-electrical converter for converting received optical signals to electrical signals, and a transmitter unit for transmitting optical signals to an optical conduction path, the transmitter unit comprising an electro-optical converter for converting electrical signals to optical signals before they are transmitted from the transmitter unit.

Further purposes and advantages of the invention will become clear from the description below.

The purposes of the invention are achieved by an interface device as defined in the annexed claim 1. In particular this interface device is of the kind described above and is further characterised in that it also comprises a switching unit and a controller. The switching unit is arranged to switch said electric circuit arrangement between at least a first and a second state. In the first state the electrical signals from the receiver unit of the first transceiver module are conducted to the transmitter unit of said first transceiver module and in said second state the electrical signals from the receiver unit of the second transceiver module are conducted to the transmitter unit of the first transceiver module. The controller is arranged to automatically control the switching unit in response to at least one control signal such that said first state is selected when said at least one control signal indicates either that no transceiver module is attached to said second receiving section or that no optical signal above a certain signal level is received by a transceiver module attached to said second receiving section.

This interface device thus allows for different manners of connecting different network units to each other. Furthermore, depending on how the network units are connected via the interface device, the interface device is capable of being automatically configured in accordance to the manner in which the network units are to be connected via the interface device. It is thus not necessary for a person to manually reconfigure the interface device depending on the manner in which the network units are to be connected to each other. The interface device may thus automatically sense whether optical signals are received via a second transceiver module. If this is not the case, it is assumed that the network units are to be connected via the first transceiver module without using any second transceiver module. The different manners in which the network units may be connected to each other will become clear through the description below.

It should be noted that said at least one control signal may be obtained in different manners. According to one embodiment, said at least one control signal is derived by either sensing a logical voltage over a sense-resistor, which voltage indicates whether a transceiver module is attached to said second receiving section, or by sensing whether a driving current is consumed by a transceiver module attached to said second receiving section. If no second transceiver module is attached to the second receiving section, then, of course, no optical signals can be received by a transceiver module attached to the second receiving section. Similarly, if no driving current is consumed by any second transceiver module, then it is assumed that the interface device is not to be configured to receive optical signals via a second transceiver module.

According to another embodiment of the interface device, said at least one control signal is derived from a level detector which indicates whether said optical signal above a certain signal level is received by a transceiver module attached to said second receiving section.

According to a further embodiment of the interface device, the controller is arranged to receive a second control signal from a network management system in order to control the switching unit between said first and second states, wherein the controller is arranged such that said second control signal determines the state of the switching unit even if said at least one control signal indicates switching to a different state. Such a second control signal thus overrides the above mentioned at least one control signal. According to this embodiment, it is thus possible to configure the interface device from a remote location via a network management system. However, it should be noted that the interface device always has the possibility to be automatically configured by said at least one control signal. In the absence of any signal from the network management system, the interface device is thus automatically configured in accordance with said at least one control signal.

According to a further advantageous embodiment, said first and second receiving sections are designed such that said first and second transceiver modules may be plugged into the receiving sections and unplugged therefrom in a quick-connect manner. It is thereby easy to attach transceiver modules to the respective receiving sections, without any need for, for example, soldering. Thereby it is also easy to remove the respective transceiver module when needed.

According to still a further embodiment, the interface device comprises a circuit board carrying said electric circuit arrangement, said first receiving section, said second receiving section, said switching unit and said controller. The use of a circuit board is an advantageous manner to arrange the different components. The receiving sections are preferably of a standard type, such that transceiver modules of a standard type may be plugged into the receiving sections.

The purposes of the invention are also achieved by a method of using the interface device according to the invention in a fiberoptic communication network including at least a first network unit arranged for bi-directional optical communication and a second network unit arranged for bi-directional optical communication. According to this method, a first transceiver module is attached to said first receiving section and said first receiver unit and said first transmitter unit are connected via a bi-directional optical communication path to said first network unit. Furthermore, a second transceiver module is attached to said second receiving section and said second receiver unit and said second transmitter unit are connected via a bi-directional optical communication path to said second network unit. Moreover, said switching unit is set in said second state.

According to this method, the interface device is used such that signals between the two network units pass through both transceiver modules. It should be noted that by "bi-directional optical communication" is here meant that the respective unit can both transmit and receive signals to/from another unit via an optical link. The optical link may comprise two optical fibers, one for conducting optical signals in one direction and one for conducting optical signals in the opposite direction.

The first network unit can, according to one aspect of the method, comprise a multiplexer/demultiplexer. This multiplexer/demultiplexer may also be connected to a larger fiberoptic network with which the second network unit may communicate via said multiplexer/demultiplexer The second network unit can, according to one realisation of the method, be a subscriber unit, wherein said interface device together with said attached first and second transceiver modules adapt the optical signals from said second network unit before transmitting the signals to said multiplexer/demultiplexer, and also adapt signals from said multiplexer/demultiplexer before they are transmitted to said second network unit.

It is also possible that said interface device together with said attached first and second transceiver modules perform the function of a repeater node in said fiberoptic communication network.

The purposes of the invention are also achieved by another method of using the interface device of the invention in a fiberoptic communication network including at least a first network unit arranged for bi-directional optical communication and a second network unit arranged for bi-directional optical communication. According to this method said first transceiver module is attached to said first receiving section and said first transmitter unit is connected to transmit optical signals to said first network unit while said first receiver unit is connected to receive optical signals from said second network unit. Furthermore, said first network unit is connected to said second network unit such that signals from the first network unit are transmitted to said second network unit without passing through said interface device. Moreover, said switching unit is set in said first state.

According to this method there is no need to use any second transceiver. Advantageously, therefore, no second transceiver module is attached to said second receiving section. The cost of the interface is thus reduced, since it is not necessary to attach a second transceiver to the interface device. Said first network unit may also in this case comprise a multiplexer/demultiplexer, which may also be connected to a larger fiberoptic network with which the second network unit may communicate via said multiplexer/demultiplexer. The second network unit may also in this case be a subscriber unit.

DESCRIPTION OF EMBODIMENTS OF THE INVENTION

Figure 3:
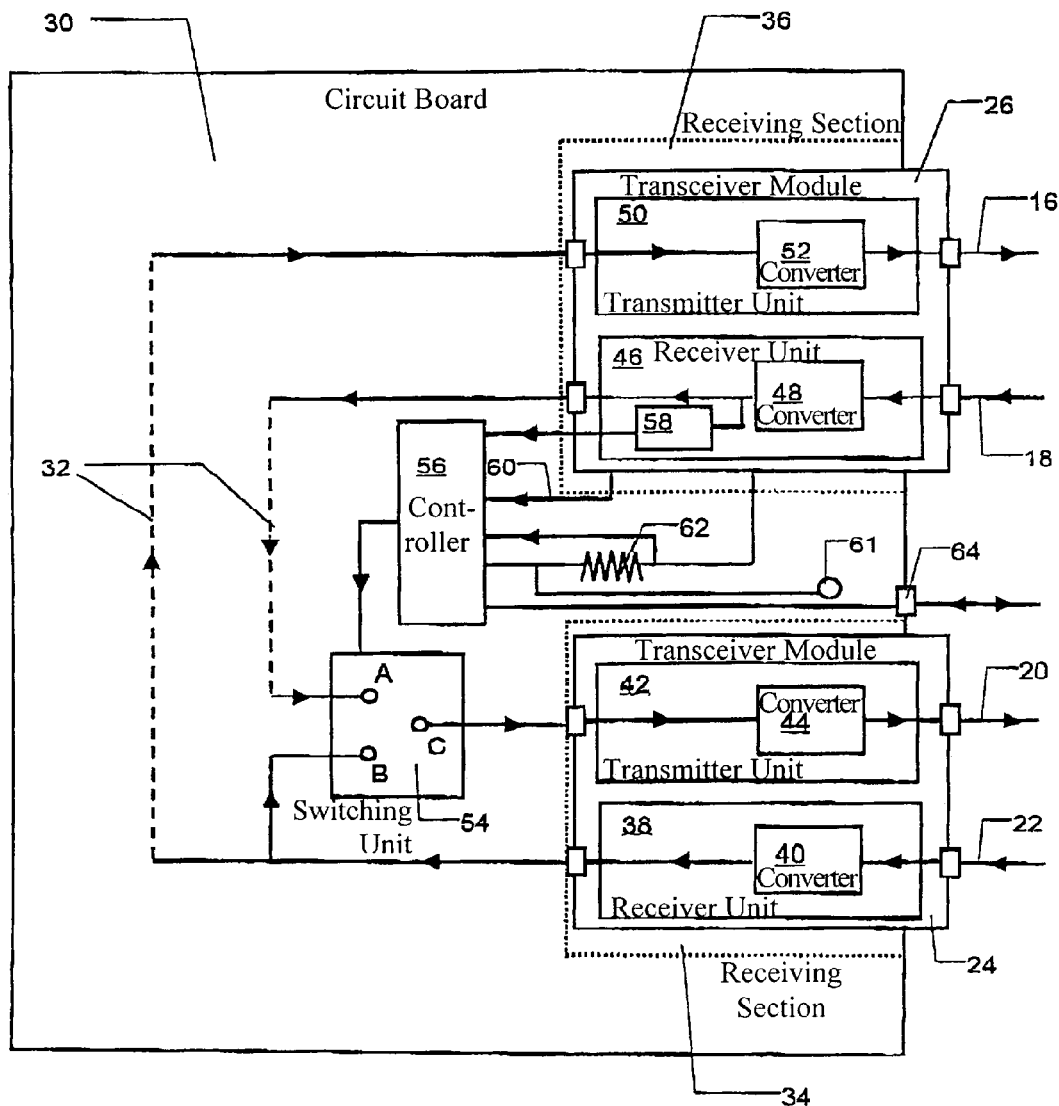
FIG. 3 shows schematically an interface device according to the invention with attached transceiver modules.

FIG. 3 shows an example of an interface device according to the invention with attached transceiver modules. It should be noted that the transceiver modules do not form part of the interface device itself, although they may be used in connection with the interface device.

The interface device constitutes a function unit which according to one embodiment may comprise a circuit board 30. The circuit board 30 carries an electric circuit arrangement 32. This electric circuit arrangement 32 may include further components (not shown) for converting or shaping electrical signals. The electric circuit arrangement 32 connects a first receiving section 34 to a second receiving section 36.

The first and second receiving sections 34, 36 are designed for receiving a first 24 and a second 26 transceiver module, respectively. In FIG. 3 such transceiver modules 24, 26 are attached to said receiving sections 34, 36.

The first transceiver module 24 includes a first receiver unit 38 for receiving optical signals from an optical conduction path, for example an optical fiber 22. The first receiver unit 38 comprises a first opto-electrical converter 40 for converting the received optical signals to electrical signals, which are adapted to be conducted to said electric circuit arrangement 32. The first transceiver module 24 also comprises a first transmitter unit 42 for transmitting optical signals to an optical conduction path, for example an optical fiber 20. The first transmitter unit 42 comprising a first electro-optical converter 44 for converting electrical signals, received from said electric circuit arrangement 32, to optical signals before they are transmitted from the transmitter unit 42.

The second transceiver module 26 includes a second receiver unit 46 for receiving optical signals from an optical conduction path, for example an optical fiber 18. The second receiver unit 46 comprises a second opto-electrical converter 48 for converting the received optical signals to electrical signals, which are adapted to be conducted to said electric circuit arrangement 32. The second transceiver module 26 also comprises a second transmitter unit 50 for transmitting optical signals to an optical conduction path, for example an optical fiber 16. The second transmitter unit 50 comprises a second electro-optical converter 52 for converting electrical signals, received from said electric circuit arrangement 32, to optical signals before they are transmitted from the transmitter unit 50.

It should be noted that the interface device together with attached transceiver modules 24, 26 carry out necessary conversion or adaptation of the received signals before transmitting the signals. This conversion and adaptation may include, for example, wavelength conversion, amplification, pulse shaping, reduction of noise etc. According to a preferred alternative, all this adaptation or conversion takes place in the transceiver modules 24, 26. However, according to an alternative embodiment, this adaptation or conversion may also take place partly or wholly in the interface device.

The first and second receiving sections 34, 36 and the first and second transceiver modules 24, 26 are preferably designed such that the transceiver modules 24, 26 may be plugged into the receiving sections 34, 36 and unplugged therefrom in a quick-connect manner. The transceiver modules and the corresponding receiving sections may therefore, according to a preferred embodiment, be configured according to some accepted standard, for example according to the Small Form-factor Pluggable (SPF) Transceiver Multisource Agreement (MSA).

The circuit board 30 also carries a switching unit 54 for switching said electric circuit arrangement 32 between at least a first and a second state. In the first state the electrical signals from the first receiver unit 38 are conducted to said first transmitter unit 42 and in said second state the electrical signals from said second receiver unit 46 are conducted to said first transmitter unit 42. The switching states may, for example, be obtained as shown in FIG. 3 in that in said first state, the point B is connected to the point C and in said second state, the point A is connected to point C.

A controller 56 is positioned on the circuit board 30 and arranged to automatically control the switching unit 54 in response to at least one control signal such that said first state is selected when said at least one control signal indicates either that no transceiver module 26 is attached to said second receiving section 36 or that no optical signal above a certain signal level is received by a working transceiver module 26 attached to said second receiving section 36, i.e. the second receiver unit 46 does not receive any such optical signal. The controller 56 may for example comprise a suitable micro-controller.

The mentioned at least one control signal can be derived from a level detector 58 which indicates whether an optical signal above a certain signal level is received by a transceiver module 26 attached to said second receiving section 36. This level detector 58 may form part of the transceiver module 26 such as is shown in FIG. 3. The level detector 58 may be formed by any suitable means known to the person skilled in the art. According to an alternative embodiment, the level detector 58 could form part of the interface device instead of being integrated in the transceiver module 26.

Another manner of deriving said at least one control signal is to sense a logical voltage over a sense-resistor 62. This can be implemented in that the resistor 62 is connected to ground potential via the transceiver module 26 when this transceiver module 26 is attached to the receiving section 36, 61 here represents a signal voltage level. When the resistor 62 is grounded, a current will flow through the resistor 62. The controller 56 may thereby sense a logical voltage over the resistor 62. Alternatively, the point 61 could constitute a power supply to the transceiver module 26. In this case, the driving current for the transceiver module 26 passes through a resistor 62. The controller 56 may thus in this case sense that a driving current is consumed by the transceiver module 26.

Said at least one control signal may however be derived in other manners than the above described. For example, this control signal may be derived from any other indicating means 60 which indicates that a transceiver module 26 is physically attached to said second receiving section 36. Such indicating means 60, may, for example, be formed by a sensor that senses that the transceiver module 26 is attached to the receiving section 36.

It should be noted that said at least one control signal could also be derived by a combination of the above manners. The controller 56 may in this case be arranged such that said first state is set whenever at least one of said manners indicates said first state.

FIG. 3 also shows that the interface device has an input/output 64 arranged to receive a second control signal from a network management system (NMS). The NMS may be located at a longer distance from the interface device. With such an NMS the switching between said first and second states may be controlled. The controller 56 is arranged such that said second control signal determines the state of the switching unit 54 even if said at least one control signal indicates switching to a different state. The communication between the interface device and the NMS is preferably bi-directional such that the NMS can receive signals from the interface device and send signals to the interface device.

Figure 4:
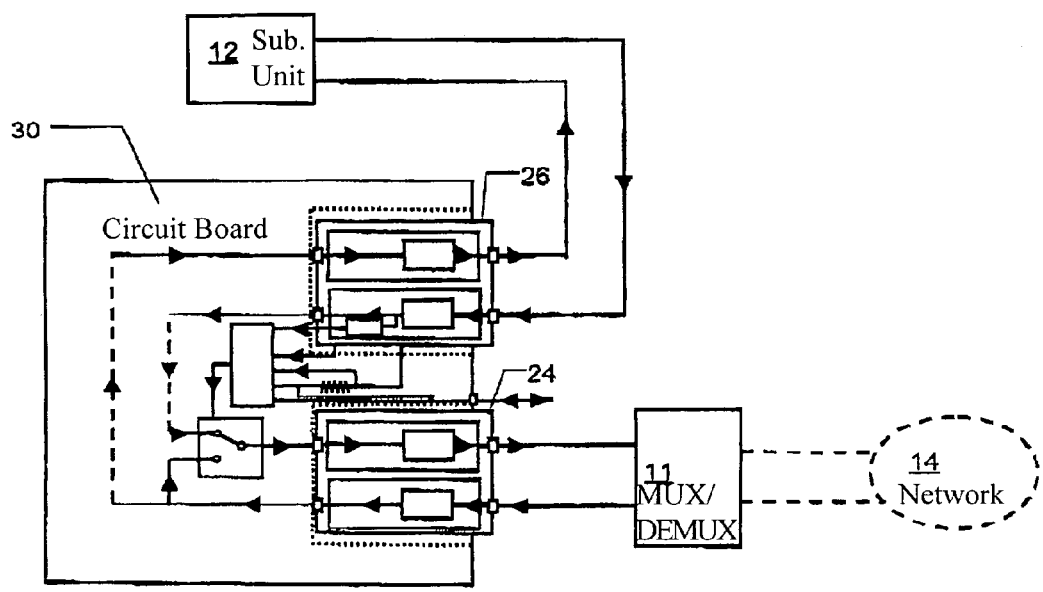
FIG. 4 illustrates a method of using the interface device of the present invention.
Figure 5:
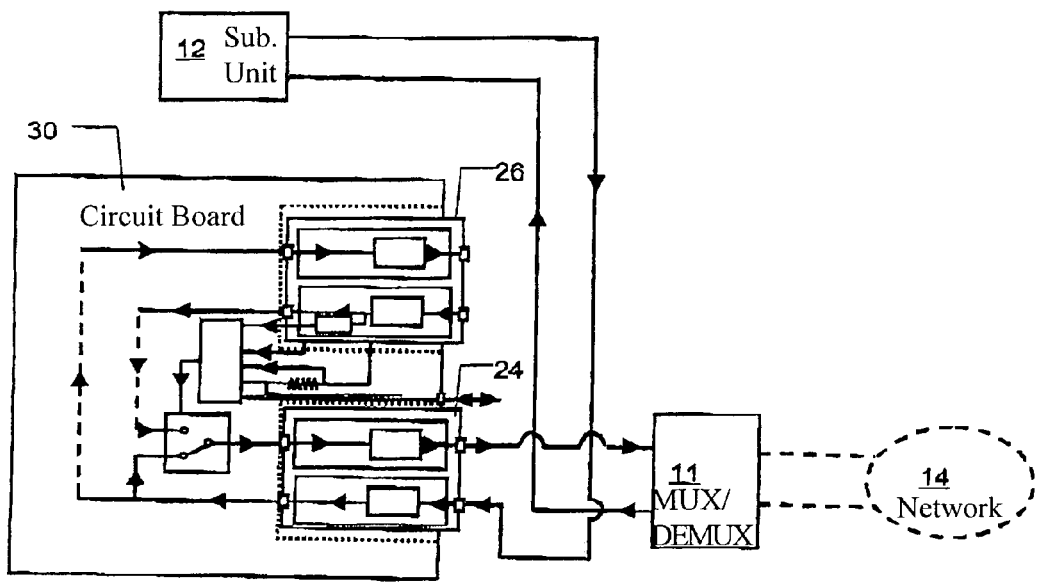
FIG. 5 illustrates another method of using the interface device of the present invention.

It should be noted that the interface device of FIG. 4 and FIG. 5 is the same as that described above. For the sake of clarity, most of the reference numbers are not included in FIG. 4 and FIG. 5.

FIG. 4 illustrates a method of using the interface device in a fiberoptic communication network including at least a first network unit 11 arranged for bi-directional optical communication and a second network unit 12 arranged for bi-directional optical communication. The first network unit 11 may constitute a multiplexer/demultiplexer, connected to a larger fiberoptic network 14 with which the second network unit 12 can communicate via the multiplexer/demultiplexer 11. The second network unit 12 can be a subscriber unit. The interface device together with said attached first and second transceiver modules 24, 26 adapt the optical signals from the subscriber unit 12 before transmitting the signals to the multiplexer/demultiplexer 11, and also adapt signals from said multiplexer/demultiplexer 11 before they are transmitted to said second network unit 12.

According to the method, said first transceiver module 24 is thus attached to said first receiving section 34 and said first receiver unit 38 and said first transmitter unit 42 are connected via a bi-directional optical communication path 22, 20 to said first network unit 11. Furthermore, the second transceiver module 26 is attached to said second receiving section 36 and the second receiver unit 46 and said second transmitter unit 50 are connected via a bi-directional optical communication path 16, 18 to said second network unit 12. The switching unit 54 of the interface device is set in said second state. This can be done automatically in that the above mentioned at least one control signal indicates that said second state should be selected. Alternatively, the device is set in said second state with the help of the network management system.

Figure 1:
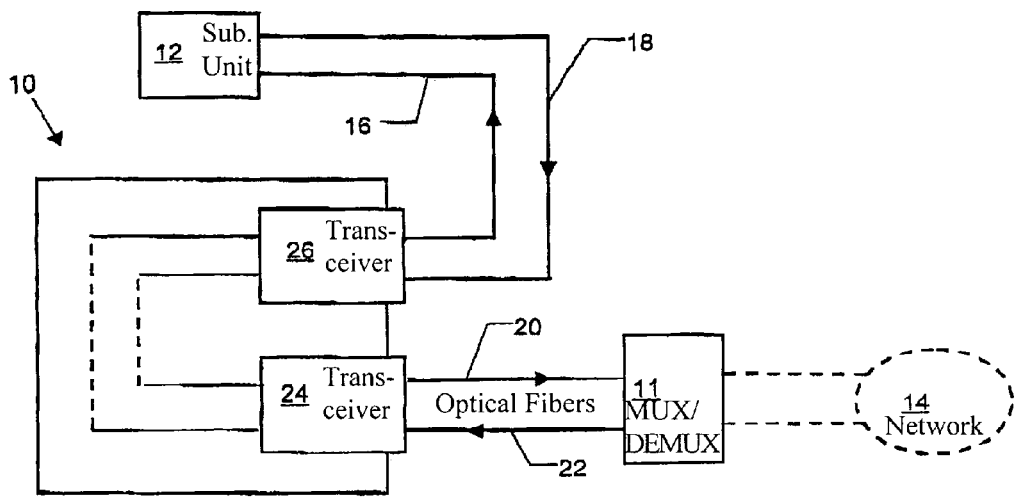
FIG. 1 shows an example of a fiberoptic network with an interface according to the prior art.
Figure 2:
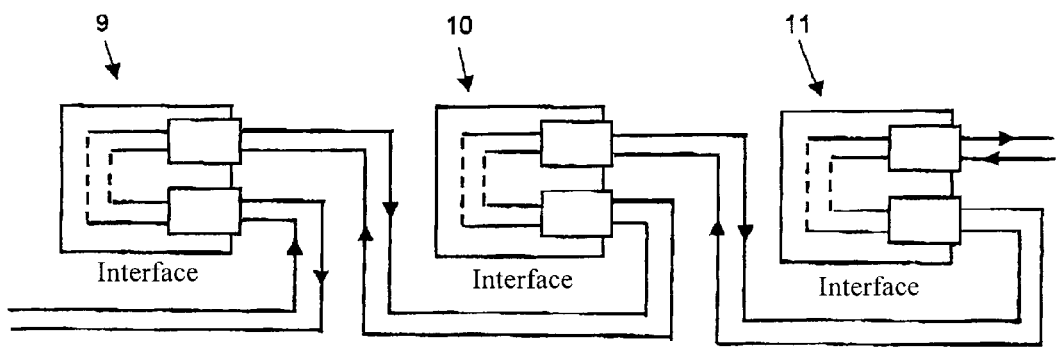
FIG. 2 shows another example of a fiberoptic network with an interface according to the prior art.

According to another manner of using the interface device, the interface device can, instead of being a link between a client unit 12 and a multiplexer/demultiplexer 11, perform the function of a repeater node in a fiberoptic communication network, i.e. the interface device is in this case integrated in the network as illustrated in FIG. 2.

Another method of using the interface device is illustrated in FIG. 5. According to this method, the first transceiver module 24 is attached to said first receiving section 34 and the first transmitter unit 42 is connected to transmit optical signals to said first network unit 11 while said first receiver unit 38 is connected to receive optical signals from said second network unit 12. Furthermore, the first network unit 11 is connected to the second network unit 12 such that signals from the first network unit 11 are transmitted to the second network unit 12 without passing through said interface device. According to this method, the switching unit 54 is set in said first state. This can be done automatically with the help of said at least one control signal described above. Alternatively, the first state can be selected with the help of a network management system. The first network unit 11 may also here comprise a multiplexer/demultiplexer, which may be connected to a larger fiberoptic network 14 with which the second network unit 12 may communicate via said multiplexer/demultiplexer 11.

According to this method of use, it is not necessary that any transceiver module be attached to the second receiving section 36. However, a transceiver module 26 may be attached, as shown in FIG. 5, but this transceiver module 26 does not receive or transmit any signals from/to the second network unit 12.

The second network unit 12 may constitute a subscriber unit and the interface device together with said attached first transceiver module 24 adapt the signals from the second network unit 12 before transmitting the signals to the multiplexer/demultiplexer 11. On the other hand, signals from the multiplexer/demultiplexer 11 are transmitted to the second network unit 12 without being adapted by said interface device or any transceiver module attached to the interface device. This manner of using the interface device is particularly suitable when the second network unit 12 is located at a shorter distance from the first network unit 11 and when the second network unit 12 is capable of receiving signals from the first network unit 11 without any need for a conversion of these signals.

The invention is not limited to the disclosed device and methods but may be varied within the scope of the annexed claims.

What is claimed is:

1. An interface device for a fiberoptic communication network, the interface device comprising:
   an electric circuit arrangement,
   a first receiving section for receiving a first transceiver module including
      a first receiver unit for receiving optical signals from an optical conduction path, the first receiver unit comprising a first opto-electrical converter for converting the received optical signals to electrical signals, which are adapted to be conducted to said electric circuit arrangement, and
      a first transmitter unit for transmitting optical signals to an optical conduction path, the first transmitter unit comprising a first electro-optical converter for converting electrical signals, received from said electric circuit arrangement, to optical signals before they are transmitted from the transmitter unit,
   a second receiving section for receiving a second transceiver module including
      a second receiver unit for receiving optical signals from an optical conduction path, the second receiver unit comprising a second opto-electrical converter for converting the received optical signals to electrical signals, which are adapted to be conducted to said electric circuit arrangement, and
      a second transmitter unit for transmitting optical signals to an optical conduction path, the second transmitter unit comprising a second electro-optical converter for converting electrical signals, received from said electric circuit arrangement, to optical signals before they are transmitted from the transmitter unit,
   a switching unit for switching said electric circuit arrangement between at least a first and a second state, wherein, in the first state the electrical signals from the first receiver unit are conducted to said first transmitter unit and in said second state the electrical signals from said second receiver unit are conducted to said first transmitter unit, and
   a controller arranged to automatically control the switching unit in response to at least one control signal such that said first state is selected when said at least one control signal indicates either that no transceiver module is attached to said second receiving section or that no optical signal above a certain signal level is received by a transceiver module attached to said second receiving section;
      wherein said first and second receiving sections are designed such that said first and second transceiver modules are pluggable into the receiving sections and unpluggable therefrom.

2. An interface device according to claim 1, arranged such that said at least one control signal is derived by either sensing a logical voltage over a sense-resistor, which voltage indicates whether a transceiver module is attached to said second receiving section, or by sensing whether a driving current is consumed by a transceiver module attached to said second receiving section.

3. An interface device according to claim 1, arranged such that said at least one control signal is derived from a level detector which indicates whether said optical signal above a certain signal level is received by a transceiver module attached to said second receiving section.

4. An interface device according to claim 1, wherein said controller is arranged to receive a second control signal from a network management system in order to control the switching unit between said first and second states, wherein the controller is arranged such that said second control signal determines the state of the switching unit even if said at least one control signal indicates switching to a different state.

5. An interface device according to claim 1, comprising a circuit board carrying said electric circuit arrangement, said first receiving section, said second receiving section, said switching unit and said controller.

6. A method of using an interface device for a fiberoptic communication network, the interface device comprising an electric circuit arrangement, a first receiving section for receiving a first transceiver module including a first receiver unit for receiving optical signals from an optical conduction path, the first receiver unit comprising a first opto-electrical converter for converting the received optical signals to electrical signals, which are adapted to be conducted to said electric circuit arrangement, and a first transmitter unit for transmitting optical signals to an optical conduction path, the first transmitter unit comprising a first electro-optical converter for converting electrical signals, received from said electric circuit arrangement, to optical signals before they are transmitted from the transmitter unit,
a second receiving section for receiving a second transceiver module including a second receiver unit for receiving optical signals from an optical conduction path, the second receiver unit comprising a second opto-electrical converter for converting the received optical signals to electrical signals, which are adapted to be conducted to said electric circuit arrangement, and a second transmitter unit for transmitting optical signals to an optical conduction path, the second transmitter unit comprising a second electro-optical converter for converting electrical signals, received from said electric circuit arrangement, to optical signals before they are transmitted from the transmitter unit, a switching unit for switching said electric circuit arrangement between at least a first and a second state, wherein, in the first state the electrical signals from the first receiver unit are conducted to said first transmitter unit and in said second state the electrical signals from said second receiver unit are conducted to said first transmitter unit, and a controller arranged to automatically control the switching unit in response to at least one control signal such that said first state is selected when said at least one control signal indicates either that no transceiver module is attached to said second receiving section or that no optical signal above a certain signal level is received by a transceiver module attached to said second receiving section; wherein said first and second receiving sections are designed such that said first and second transceiver modules are pluggable into the receiving sections and unpluggable therefrom in a fiberoptic communication network including at least a first network unit arranged for bi-directional optical communication and a second network unit arranged for bi-directional optical communication, the method comprising:
attaching said first transceiver module to said first receiving section;
connecting said first receiver unit and said first transmitter unit via a bi-directional optical communication path to said first network unit;
attaching said second transceiver module to said second receiving section;
connecting said second receiver unit and said second transmitter unit via a bi-directional optical communication path to said second network unit; and
setting said switching unit in said second state.

7. A method according to claim 6, wherein said first network unit comprises a multiplexer/demultiplexer.

8. A method according to claim 7, wherein said multiplexer/demultiplexer is also connected to a larger fiberoptic network with which the second network unit may communicate via said multiplexer/demultiplexer.

9. A method according to claim 8, wherein said second network unit is subscriber unit, wherein said interface device together with said attached first and second transceiver modules adapt the optical signals from said second network unit before transmitting the signals to said multiplexer/demultiplexer, and also adapt signals from said multiplexer/demultiplexer before they are transmitted to said second network unit.

10. A method according to claim 6, wherein said interface device together with said attached first and second transceiver modules perform the function of a repeater node in said fiberoptic communication network.

11. A method of using an interface device for a fiberoptic communication network, the interface device comprising an electric circuit arrangement, a first receiving section for receiving a first transceiver module including a first receiver unit for receiving optical signals from an optical conduction path, the first receiver unit comprising a first opto-electrical converter for converting the received optical signals to electrical signals, which are adapted to be conducted to said electric circuit arrangement, and a first transmitter unit for transmitting optical signals to an optical conduction path, the first transmitter unit comprising a first electro-optical converter for converting electrical signals, received from said electric circuit arrangement, to optical signals before they are transmitted from the transmitter unit,
a second receiving section for receiving a second transceiver module including a second receiver unit for receiving optical signals from an optical conduction path, the second receiver unit comprising a second opto-electrical converter for converting the received optical signals to electrical signals, which are adapted to be conducted to said electric circuit arrangement, and a second transmitter unit for transmitting optical signals to an optical conduction path, the second transmitter unit comprising a second electro-optical converter for converting electrical signals, received from said electric circuit arrangement, to optical signals before they are transmitted from the transmitter unit, a switching unit for switching said electric circuit arrangement between at least a first and a second state, wherein, in the first state the electrical signals from the first receiver unit are conducted to said first transmitter unit and in said second state the electrical signals from said second receiver unit are conducted to said first transmitter unit, and a controller arranged to automatically control the switching unit in response to at least one control signal such that said first state is selected when said at least one control signal indicates either that no transceiver module is attached to said second receiving section or that no optical signal above a certain signal level is received by a transceiver module attached to said second receiving section; wherein said first and second receiving sections are designed such that said first and second transceiver modules are pluggable into the receiving sections and unpluggable therefrom in a fiberoptic communication network including at least a first network unit arranged for bi-directional optical communication and a second network unit arranged for bi-directional optical communication, the method comprising:

attaching said first transceiver module to said first receiving section;

connecting said first transmitter unit to transmit optical signals to said first network unit while said first receiver unit is connected to receive optical signals from said second network unit;

connecting said first network unit to said second network unit such that signals from the first network unit are transmitted to said second network unit without passing through said interface device; and setting said switching unit in said first state.

12. A method according to claim 11, wherein no second transceiver module is attached to said second receiving section.

13. A method according to claim 11, wherein said first network unit comprises a multiplexer/demultiplexer.

14. A method according to claim 13, wherein said multiplexer/demultiplexer is also connected to a larger fiberoptic network with which the second network unit may communicate via said multiplexer/demultiplexer.

15. A method according to claim 14, wherein said second network unit is subscriber unit, wherein said interface device together with said attached first transceiver module adapt the optical signals from said second network unit before transmitting the signals to said multiplexer/demultiplexer, while signals from said multiplexer/demultiplexer are transmitted to said second network unit without being adapted by said interface device or any transceiver module attached to the interface device.

* * * * *